United States Patent
Reefman et al.

(10) Patent No.: US 6,690,812 B2
(45) Date of Patent: Feb. 10, 2004

(54) WATERMARK INSERTION AND EXTRACTION INTO AND FROM A HIGH QUALITY SIGNAL IS PERFORMED USING SAMPLE RATE CONVERSION

(75) Inventors: Derk Reefman, Eindhoven (NL); Alphons Antonius Maria Lambertus Bruekers, Eindhoven (NL); Franciscus Lucas Antonius Johannes Kamperman, Eindhoven (NL); Antonius Adriaan Maria Staring, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 245 days.

(21) Appl. No.: 09/855,579

(22) Filed: May 15, 2001

(65) Prior Publication Data

US 2001/0055408 A1 Dec. 27, 2001

(30) Foreign Application Priority Data

May 22, 2000 (EP) .............................. 00201770
Jun. 14, 2000 (EP) .............................. 00202066

(51) Int. Cl.$^7$ ................................ H04K 1/00
(52) U.S. Cl. ....................... 382/100; 380/238
(58) Field of Search ................ 382/100, 232; 380/210, 236, 237, 238, 252, 287; 381/73.1; 704/200.1, 270, 273; 370/527, 529; 713/176

(56) References Cited

U.S. PATENT DOCUMENTS

| | | | | |
|---|---|---|---|---|
| 5,946,402 A | * | 8/1999 | Nishio et al. ............... | 381/103 |
| 2003/0009248 A1 | * | 1/2003 | Wiser et al. .................. | 700/94 |

FOREIGN PATENT DOCUMENTS

| | | | | |
|---|---|---|---|---|
| EP | 0 372 601 A1 | * | 6/1990 | ............ H04B/1/66 |
| EP | 0565947 A1 | | 10/1993 | ........... H04B/14/04 |
| WO | WO 97/13248 A1 | * | 4/1997 | ............ G11B/20/00 |
| WO | WO 98/33324 A2 | * | 7/1998 | ............ H04N/7/50 |

OTHER PUBLICATIONS

Czerwinski et al., "Digital Music Distribution and Audio Watermarking," *Project Report UCB IS 219*, University of California, Berkeley, Spring 1999, 10 pages.*
Swanson et al., "Current state of the art, challenges and future directions for audio watermarking," *Proc. IEEE Int. Conf. on Multimedia Computing and Systems*, Jul. 1999, pp. 19–24.*
Dittmann et al., "Digital Watermarking for MPEG Audio Layer 2," *Proc. Multimedia and Security Workshop at ACM Multimedia'99 (GMD Report 85)*, Oct./Nov. 1999, pp. 129–134.*
Wu et al., "Object–Based Multiresolution Watermarking of Images and Video," *Proc. 2000 IEEE Int. Symp. on Circuits and Systems*, vol. I, May 2000, pp. 212–215.*

* cited by examiner

*Primary Examiner*—Andrew W. Johns
(74) *Attorney, Agent, or Firm*—Edward W. Goodman

(57) ABSTRACT

A high-quality signal, for example, a unity-bit coded (DSD) audio signal having a 2.822 MHz bit rate (fs1) is converted to a lower sample rate (fs3) PCM signal by a sample rate converter (102). The watermark is embedded at the lower sample rate by a conventional watermark embedder (101) which is capable of handling signals at this lower rate. The watermark (WM) is not otherwise available. It is subsequently retrieved by subtracting (103) the unwatermarked signal from the watermarked signal, and up-sampled (104) to an intermediate sampling rate (fs2). The DSD signal is converted (110) to a PCM signal at said intermediate sample rate. The retrieved watermark is then added (107) to the PCM signal and the watermarked PCM signal is back-converted (120) to a unity-bit coded DSD signal. The arrangement preferably includes a compensation circuit (105) which compensates the information signal X' for any (e.g., non-linear) operations performed by the embedder (101) so as to minimize the estimated watermark (WM'). The compensation circuit re-introduces said operations in the DSD domain by controlling parameters, such as, scaling (106, 109) and time shifting (108).

13 Claims, 3 Drawing Sheets

WATERMARK INSERTION AND EXTRACTION INTO AND FROM A HIGH QUALITY SIGNAL IS PERFORMED USING SAMPLE RATE CONVERSION

BACKGROUND OF THE INVENTION

1. Field of the Invention

The invention relates to a method and arrangement for inserting a watermark in an information signal, more particularly, a high quality audio signal. The invention also relates to a method and arrangement for extracting the watermark from a watermarked signal.

2. Description of the Related Art

Watermarking is a well-known technique for protecting software against piracy. The general structure of a watermarking system is shown in FIG. 1. An original signal X is input to the system. A watermark WM is embedded in the signal X by a watermark embedder 100. The watermarked signal Y is perceptually indistinguishable from X but detectable by a detector 200. In practice, the watermarked signal Y is subjected to various types of signal processing P 300, for example, compression. If any type processing P renders the watermark WM undetectable from the processed signal Z, the watermark WM is said to be fragile. It is semi-fragile if some predefined signal-processing algorithms P leave the watermark WM detectable, whereas other types of processing render the watermark undetectable. The watermark WM is said to be robust if it can only be removed by very crude processing P, such that the reproduced signal is seriously degraded.

In the course of standardization of watermarking, the music industry has defined various types of processing P which allow discriminating between the above-mentioned types of watermarking. A number of existing watermarking schemes will be examined for compliance with the requirements set by the music industry. This relates both to sound quality and robustness.

The embedding of the watermark in current audio watermarking equipment is critically dependent on the audio signal representation. Existing watermarking schemes are optimized for signal representations with multiple bits per sample and sample rates not exceeding 96 kHz. A well-known example of such a signal representation is CD audio (16-bit PCM at 44.1 kHz). Other representations, such as high-rate signals, in which amplitude resolution is exchanged against time resolution, require different watermark embedding equipment or methods. An example of such a signal representation is Direct Stream Digital (DSD, 1-bit samples at 64×44.1 kHz) recorded on Super Audio CD.

SUMMARY OF THE INVENTION

It is an object of the invention to provide a universal method and arrangement for embedding and detecting a watermark in arbitrary-bit arbitrary-rate signals.

This object is achieved in a method of embedding a watermark in an information signal having a first sample frequency, the method comprising the steps sample rate converting said information signal to a predetermined second sample frequency; embedding the watermark in the converted signal at said second sample frequency; retrieving the watermark at the first sample frequency from the watermarked signal; and embedding the retrieved watermark in the information signal at the first sample frequency.

This object is also achieved in an arrangement for embedding a watermark in an information signal having a first sample frequency, the arrangement comprising a sample rate converter for converting said information signal to a predetermined second sample frequency; a watermark embedder for embedding the watermark in the converted signal at said second sample frequency; means for retrieving the watermark at the first sample frequency from the watermarked signal; and means for embedding the retrieved watermark in the information signal at the first sample frequency.

It is achieved with the invention that standard watermark embedders developed for multi-bit PCM signals can be used for any type of signal representation, even if the watermark is not directly available.

DESCRIPTION OF THE PREFERRED EMBODIMENTS

Figure 1:
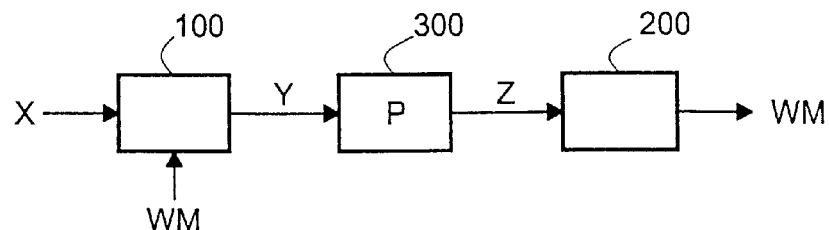
FIG. 1 shows the general structure of a transmission chain including a watermark embedder and a watermark detector.
Figure 2:
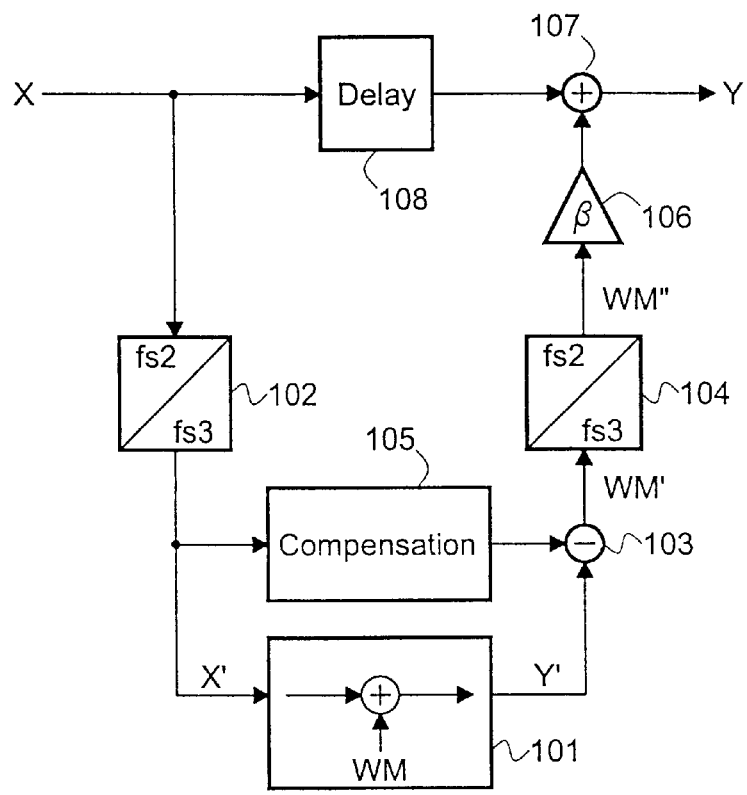
FIG. 2 shows a schematic diagram of an arrangement for embedding a watermark in an information signal in accordance with the invention.

FIG. 2 shows an arrangement for inserting a watermark in an information signal in accordance with the invention. The input signal X is a high-quality digital audio signal having multi-bit samples (e.g., 24 bits/sample) at a high sampling rate fs2 (e.g., 96 kHz). It is assumed that the watermark to be embedded is not available as such. Instead, a watermark embedder 101 is available which is capable of handling lower quality signal representations, for example, conventional CD quality (16-bit samples at 44.1 kHz).

The high quality signal X is converted to the lower sample rate fs3 (44.1 kHz) by a sampling rate converter 102. The converted signal X' is applied to the watermark embedder 101. For simplicity, the watermark embedding is shown as a simple addition of the watermark WM to the digital signal X' in the time domain. However, the embedder 101 may be any watermark embedder employing other techniques, such as, time warping or embedding in the frequency domain.

The output watermarked signal Y' of watermark embedder 101 contains the watermark WM. The watermark is subsequently retrieved in the fs2 domain. In the embodiment, this is achieved by subtracting 103 the unwatermarked signal X' from the watermarked signal Y' in the fs3 domain, followed by up-sampling 104 the retrieved watermark WM' to the fs2 domain. Alternatively, the subtraction may be carried out in the fs2 domain. In that case, the watermarked signal Y' is first up-sampled and the input signal X is subtracted therefrom. A compensation circuit 105 may be necessary to minimize errors. The compensation circuit 105 may comprise delays, filters and scalers. The retrieved and up-sampled watermark WM" is scaled 106 and subsequently embedded 107 in the signal X, possibly after subjecting the input signal to a suitable delay 108. In the embodiment, the embedding 107 of the watermark is represented by an adder. More generally, the embedding operation 107 is complementary to the retrieving operation 103.

Figure 3:
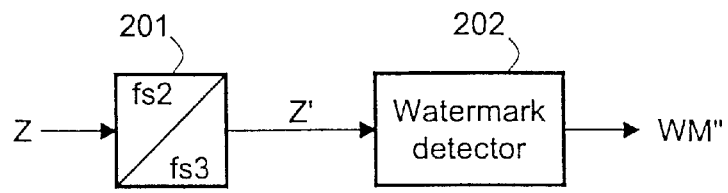
FIG. 3 shows a schematic diagram of an arrangement for detecting a watermark in an information signal in accordance with the invention.

FIG. 3 shows an arrangement for extracting the watermark in accordance with the invention. The arrangement comprises a sample rate converter 201 for converting the sample rate fs2 of the watermarked signal Z to the sample rate fs3, and a conventional watermark detector 202 which is capable of handling signals at this sample rate fs3. Any known watermark detector 202 for standard multi-bit PCM signals (e.g., 16 bits/sample, 44.1 kHz) can, hence, be used for watermark extraction in arbitrary-bit arbitrary-rate signals.

Figure 4:
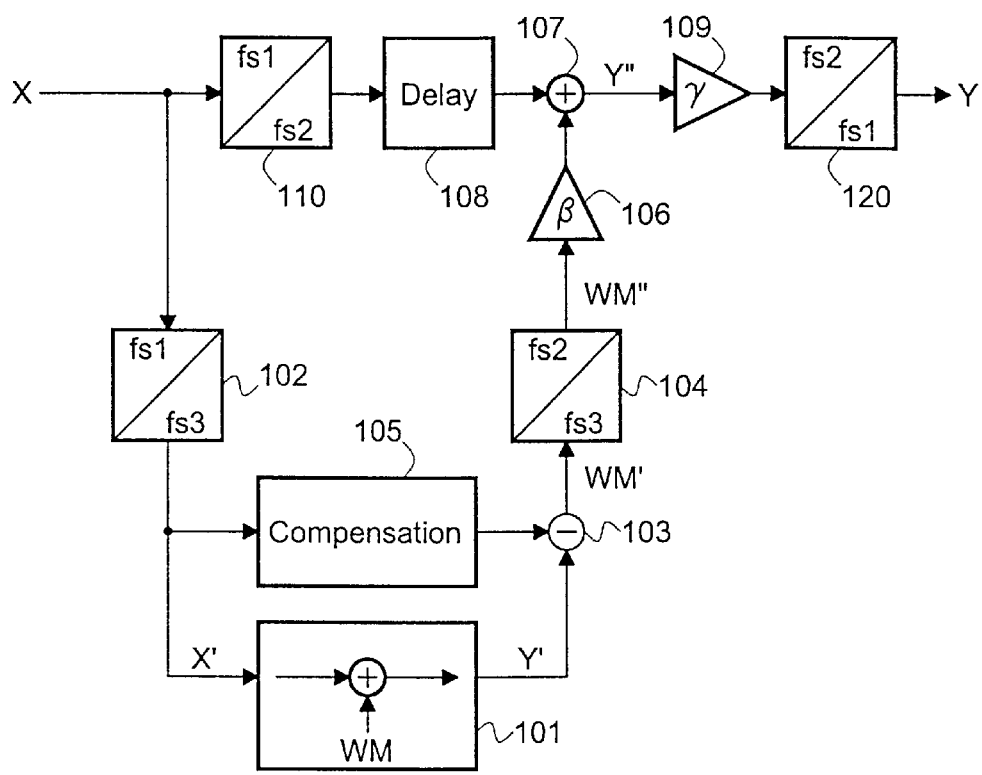
FIG. 4 shows an embodiment of the arrangement for embedding a watermark in a unity-bit coded information signal.

FIG. 4 shows an embodiment of an arrangement for embedding the watermark WM in high-quality unity-bit coded signals. Unity-bit coded signals are high-rate signals in which amplitude resolution has been exchanged against time resolution. They are usually obtained by (sigma) delta modulation. An example is DSD (1-bit samples at 64×44.1 kHz) being recorded on Super Audio CD. Unity-bit coded signals require a different watermark embedder and detector than PCM signals. The invention provides the facility to embed and extract the watermark in a DSD signal with a conventional PCM watermark embedder 101 and detector 202.

The arrangement comprises a converter 110 which converts the unity-bit coded signal X into a multi-bit signal at a suitable intermediate sample frequency fs2, thereby maintaining the high quality (e.g., 24 bits/sample at 128 kHz). The multi-bit signal is subsequently watermarked in the manner described above with reference to FIG. 2. After the embedding process, the watermarked multi-bit signal Y" is back-converted into a unity-bit coded watermarked signal Y by a converter 120 (e.g., a sigma-delta modulator). Note that, as shown in FIG. 4, the converter 102 may directly convert the unity-bit coded signal X (fs1) to the low sample rate signal X' (fs3) rather than from fs2 to fs3.

It may be necessary to normalize the power of the watermarked output signal. In the case of DSD signals, such normalizing 109 is preferably carried out prior to the conversion 120 from multi-bit PCM to unity bit DSD.

The corresponding watermark detector is the same as described above with reference to FIG. 3, the converter 201 now receiving the unity-bit coded signal at bit rate fs1.

It is further noted that the sample rate frequencies fs1, fs2 and fs3 are preferably such that fs1 and fs2 are integral multiples of fs3.

The modification circuit 105 will now be described. The circuit is not necessary for purely additive watermarks. However, existing watermark embedders 101 include non-linear operations in their watermarking process. In the following description, two of such non-linear operations will be elaborated on, and their impact on the final DSD stream will be outlined.

EXAMPLE 1

Purely adding the watermark WM to the PCM signal X' leads to a signal Y'=X'+WM. If the powers of the signal X' and the watermark WM are denoted Px' and Pw, respectively, and assuming that there is no correlation between the watermark WM and the signal X', the power Py' of the signal Y' equals Py'=Px'+Pw. Because most existing embedders 101 scale the power of the watermarked signal in such a way that it equals the power of the input signal, the watermarked signal Y' looks like:

$$Y'=\sqrt{Px'/(Px'+Pw)}(X'+WM)$$

Now, if we create an estimate WM' of the watermark signal WM by subtracting X' from Y', we obtain:

$$WM'=(\sqrt{Px'/(PX'+PW)}-1)X'+\sqrt{Px'/(Px'+Pw)}WM)$$

The power of the watermark can easily increase to 10% of the total signal power in practice. This means that the estimate WM' of the watermark signal contains 5% of the PCM signal X'. It is an established fact that the signal quality of DSD is substantially better than 44.1 kHz, or even 96 kHz, PCM. It must, therefore, be avoided that a low quality replica of the signal enters the DSD output stream.

EXAMPLE 2

Another non-linear operation, which is often used, is a time-shift. Suppose that the watermark signal WM is embedded by delaying the signal over a certain (well-defined) time T, leading to a watermarked signal Y'. The effect thereof on the estimated watermark WM' after subtracting the watermarked signal Y' from the signal X' can be easily understood if we look at a single sine wave with frequency w from the Fourier decomposition of the signal X'.

Figure 5:
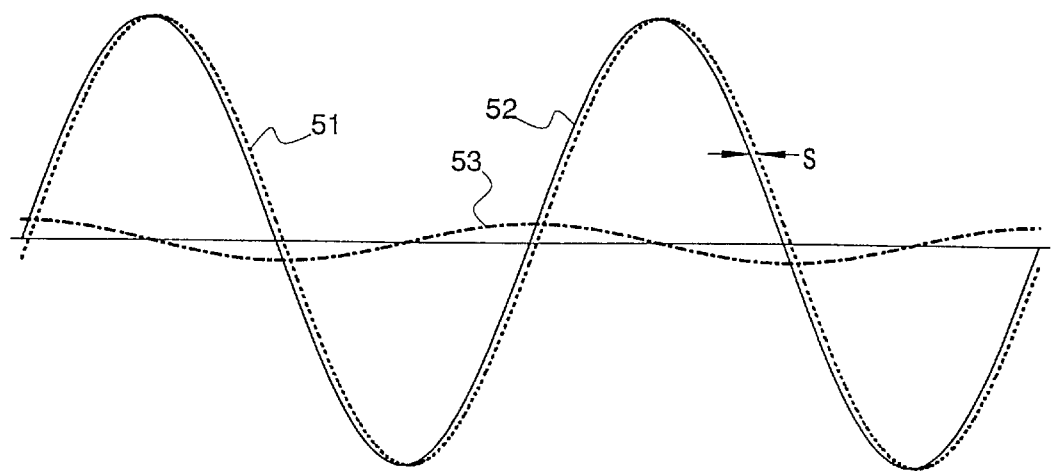
FIG. 5 shows a diagram to illustrate the effect of nonlinear watermark embedding.

In that case, $$X'=\sin(\omega t)$$

$$Y'=\sin(\omega(t+s))$$

where s is the time shift introduced. For the watermark estimate WM' we thus have:

$$WM'=\sin(\omega t)-\sin(\omega)(t+s))$$

$$=\sin(\omega t)(1-\cos(\omega s))-\sin(\omega s)\cos(\omega t)$$

which is a 90° phase-shifted PCM replica of the original PCM signal X'. This is illustrated graphically in FIG. 5, in which the resultant 53 from the subtraction of a sine 51 and its time-shifted variant 52 is shown. The Figure shows that even for small shifts s, the signal WM' contains large fractions of the PCM signal X'. As in the previous example, the result of embedding the signal WM' in the DSD stream would result in a substantial contamination of the DSD signal with a PCM-quality signal, which should, if possible, be avoided.

The purpose of the compensation circuit 105 is to create an estimate WM' of the watermark signal which is as small as possible. To this end, the compensation circuit comprises a time delay d and a scaler having a scaling factor s. Extracting the scaling factor and time delay to be applied is relatively easy. Least-square error minimization strategies known in the art can be used for that purpose. For the examples discussed above, this could mean that in the case of Example 1, the compensation circuit 105 applies a scaling factor, such that the estimate WM' is not contaminated by the original signal X; in the case of Example 2, the compensation circuit introduces a phase shift which renders the estimate WM' very small. At this moment, it seems realistic to extract delays and scalings in the compensation, as these seem relatively easy to extract and lead to a significant reduction of the PCM contamination of the DSD signal. Note that there is no principal limitation with respect to other (e.g., non-linear) operations that can be extracted in the compensation stage.

Figure 6:
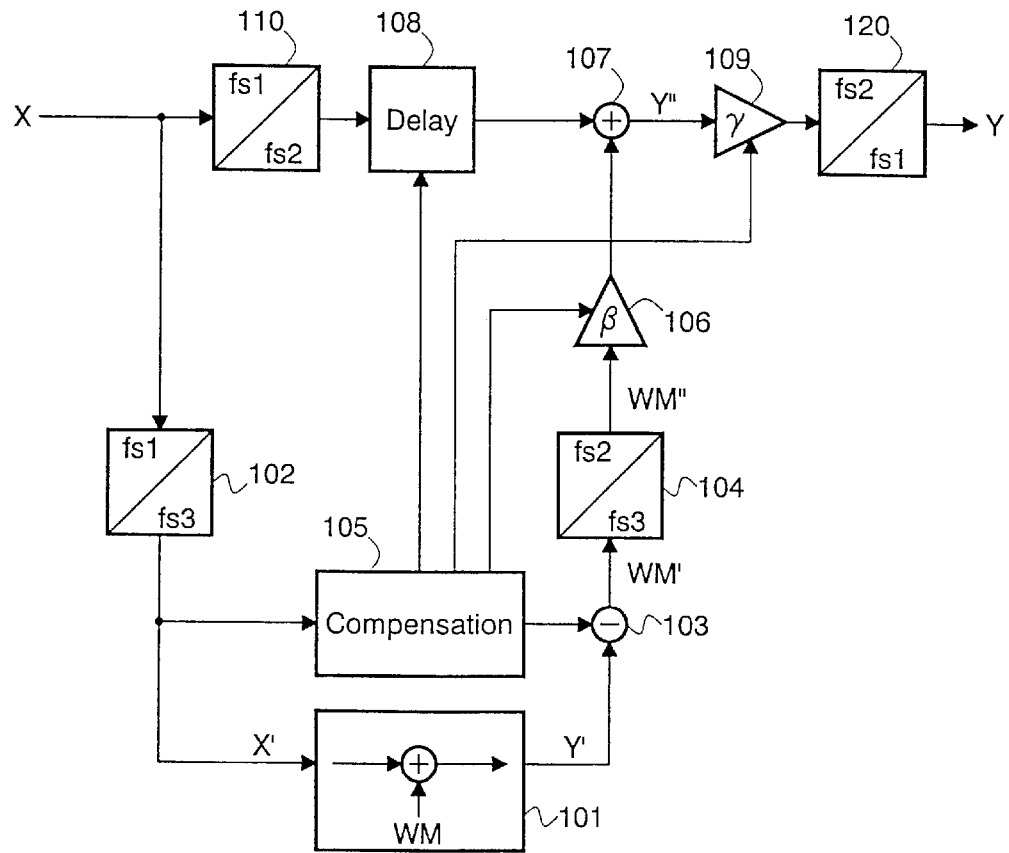
FIG. 6 shows a schematic diagram of a further embodiment of the arrangement for embedding a watermark in an information signal.

It is even possible that one or more parameters, in particular, time shifting, may be an integral parameter of the embedding process 101. In that case, it is essential to apply the same parameter to the embedding process in the fs2 domain in order for the detector to work correctly. To this end, a further embodiment of the embedder is shown in FIG. 6, in which the compensation circuit 105 dynamically controls delay 108 and gains 106 and/or 109 in accordance with the extracted parameters. It should be noted that the compensation is a dynamical process in this case. The parameters it extracts can vary, albeit slowly, on the time scale of the music.

Concisely stated, the preferred embodiment, which is shown in FIG. 6, performs the following steps:
- extracting any (non-linear) operations performed by the PCM embedder;
- determining the residual WM' after removal of these operations;
- adding the residual WM' to the DSD stream, and
- performing the (non-linear) operations in the DSD domain.

The invention can be summarized as follows. A high-quality signal, for example a unity-bit coded (DSD) audio signal having a 2.822 MHz bit rate (fs1) is converted to a lower sample rate (fs3) PCM signal by means of a sample rate converter (102). The watermark is embedded at the lower sample rate by a conventional watermark embedder (101) which is capable of handling signals at this lower rate. The watermark (WM) is not otherwise available. It is subsequently retrieved by subtracting (103) the unwatermarked signal from the watermarked signal, and up-sampled (104) to an intermediate sampling rate (fs2). The DSD signal is converted (110) to a PCM signal at said intermediate sample rate. The retrieved watermark is then added (107) to the PCM signal and the watermarked PCM signal is back-converted (120) to a unity-bit coded DSD signal.

In a preferred embodiment, the arrangement includes a compensation circuit (105) which compensates the information signal X' for any (e.g., non-linear) operations performed by the embedder (101) so as to minimize the estimated watermark (WM'). The compensation circuit re-introduces said operations in the DSD domain by controlling parameters, such as, scaling (106, 109) and time shifting (108).

What is claimed is:

1. A method of embedding a watermark in an information signal having a first sample frequency, the method comprising the steps:
    sample rate converting said information signal to a predetermined second sample frequency;
    embedding the watermark in the converted signal at said second sample frequency;
    retrieving the watermark at the first sample frequency from the watermarked signal; and
    embedding the retrieved watermark in the information signal at the first sample frequency.

2. The method as claimed in claim 1, wherein said step of retrieving comprises the steps:
    subtracting the information signal from the watermarked signal at the second sample frequency; and
    sample rate converting the retrieved watermark to the first sample frequency.

3. The method as claimed in claim 2, wherein said step of retrieving further comprises the step:
    compensating the sample rate converted information signal for non-additive operations carried out by the step of embedding.

4. The method as claimed in claim 1, wherein said method further comprising the steps:
    detecting non-additive operations carried out by the step of embedding; and
    subjecting the information signal to said non-additive operations.

5. The method as claimed in claim 1, wherein said step of retrieving comprises the steps:
    sample rate converting the watermarked signal to the first sample frequency; and
    subtracting the information signal from the watermarked signal at the first sample frequency.

6. A method of embedding a watermark in a unity-bit coded information signal at a given bit rate, the method comprising the steps:
    converting said unity-bit coded signal to a multi-bit information signal at the first sample frequency;
    embedding the watermark in the multi-bit information signal in accordance with the method as claimed in claim 1; and
    converting the watermarked multi-bit signal back to a unity-bit representation at the given bit rate.

7. The method as claimed in claim 6, wherein the step of sample rate converting the information signal to the second sample frequency is applied to the unity-bit coded information signal.

8. A method of detecting a watermark in a suspect information signal being sampled at a first sample frequency, the method comprising the steps:
    converting the suspect signal to a predetermined second sample frequency; and
    detecting the watermark in the converted suspect signal using a watermark detector being arranged to detect said watermark in a signal sampled at said second sample frequency.

9. The method as claimed in claim 8, wherein the suspect information signal is unity-bit coded at a given bit rate.

10. An arrangement for embedding a watermark in an information signal having a first sample frequency, the arrangement comprising:
    a sample rate converter for converting said information signal to a predetermined second sample frequency;
    a watermark embedder for embedding the watermark in the converted signal at said second sample frequency;
    means for retrieving the watermark at the first sample frequency from the watermarked signal; and
    means for embedding the retrieved watermark in the information signal at the first sample frequency.

11. An arrangement for embedding a watermark in a unity-bit coded information signal at a given bit rate, the arrangement comprising:
    a converter for converting said unity-bit coded signal to a multi-bit information signal at the first sample frequency;
    the arrangement as claimed in claim 10 for embedding the watermark in the multi-bit information signal; and
    a converter for converting the watermarked multi-bit signal back to a unity-bit representation at the given bit rate.

12. An arrangement for detecting a watermark in a suspect information signal being sampled at a first sample frequency, the arrangement comprising:
    means for converting the suspect signal to a predetermined second sample frequency; and
    means for detecting the watermark in the converted suspect signal using a watermark detector being arranged to detect said watermark in a signal sampled at said second sample frequency.

13. An arrangement as claimed in claim 12, wherein the suspect information signal is unity-bit coded at a given bit rate.

* * * * *